US012117159B2

(12) United States Patent
Vilem et al.

(10) Patent No.: US 12,117,159 B2
(45) **Date of Patent: *Oct. 15, 2024**

(54) HOMOGENIZATION OF AN LED ARRAY

(71) Applicant: ROBE lighting s.r.o., Roznov pod Radhostem (CZ)

(72) Inventors: Jan Vilem, Vsetin (CZ); Tomas David, Podoli (CZ); Josef Valchar, Prostredni Becva (CZ)

(73) Assignee: ROBE lighting s.r.o., Roznov pod Radhostem (CZ)

( * ) Notice: Subject to any disclaimer, the term of this patent is extended or adjusted under 35 U.S.C. 154(b) by 0 days.

This patent is subject to a terminal disclaimer.

(21) Appl. No.: 18/450,141

(22) Filed: Aug. 15, 2023

(65) Prior Publication Data

US 2023/0383923 A1 Nov. 30, 2023

Related U.S. Application Data

(63) Continuation of application No. 17/986,423, filed on Nov. 14, 2022, now Pat. No. 11,767,964.

(60) Provisional application No. 63/279,537, filed on Nov. 15, 2021.

(51) Int. Cl.

| | |
|---|---|
| ***F21V 5/00*** | (2018.01) |
| ***F21S 41/275*** | (2018.01) |
| ***F21V 3/04*** | (2018.01) |
| *F21Y 105/10* | (2016.01) |

(52) U.S. Cl.

CPC ............ *F21V 5/007* (2013.01); *F21S 41/275* (2018.01); *F21V 3/049* (2013.01); *F21Y 2105/10* (2016.08)

(58) Field of Classification Search

CPC ....................... F21V 5/007; F21Y 2105/10–18

See application file for complete search history.

(56) References Cited

U.S. PATENT DOCUMENTS 5,066,099 A * 11/1991 Yoshida ............... G03B 21/625 359/453
7,654,713 B2 * 2/2010 Tendo .................. F21S 41/275 362/309
7,686,486 B2 3/2010 Tessnow et al.

(Continued)

OTHER PUBLICATIONS

Office Action dated Jan. 24, 2023; U.S. Appl. No. 17/986,423, filed Nov. 14, 2022; 10 pages.

(Continued)

*Primary Examiner* — Tracie Y Green
*Assistant Examiner* — Michael Chiang
(74) *Attorney, Agent, or Firm* — Conley Rose, P.C.; Brooks W Taylor

(57) ABSTRACT

A luminaire and LED light engine are provided. The luminaire includes the LED light engine and an optical device. The LED light engine includes an LED array and a partial diffuser. The partial diffuser diffuses light that is emitted by LEDs of a selected first subset of LEDs in the LED array and leaves undiffused light that is emitted by LEDs of a second subset of LEDs in the LED array. At least some LEDs are selected for inclusion in the first subset as emitting light that produces poorly blended colors in a light beam emitted by the LED array. The optical device is configured to receive a light beam emitted from the LED light engine and emit a modified light beam.

16 Claims, 12 Drawing Sheets

(56) References Cited

U.S. PATENT DOCUMENTS

| | | | | |
|---|---|---|---|---|
| 8,070,339 | B2 * | 12/2011 | Koike | F21S 41/275 362/539 |
| 9,429,292 | B2 * | 8/2016 | Choi | F21S 41/19 |
| 10,240,741 | B2 * | 3/2019 | Harrington, Jr. | F21S 41/29 |
| 11,549,654 | B2 | 1/2023 | Lee et al. | |
| 11,767,964 | B2 * | 9/2023 | Vilem | F21V 5/007 362/311.02 |
| 11,774,063 | B2 * | 10/2023 | Roth | F21V 5/002 362/257 |
| 2011/0063836 | A1 * | 3/2011 | Salm | F21V 13/04 359/811 |
| 2013/0093360 | A1 | 4/2013 | Vinther et al. | |
| 2020/0236759 | A1 | 7/2020 | Jurik et al. | |
| 2022/0104320 | A1 * | 3/2022 | Jiang | F21V 5/00 |

OTHER PUBLICATIONS

Notice of Allowance dated May 15, 2023; U.S. Appl. No. 17/986,423, filed Nov. 14, 2022; 9 pages.
European Extended Search Report; Application No. 22207355.3; Apr. 17, 2023; 10 pages.

* cited by examiner

HOMOGENIZATION OF AN LED ARRAY

CROSS-REFERENCE TO RELATED APPLICATIONS

This application is a continuation of U.S. patent application Ser. No. 17/986,423 filed Nov. 14, 2022 by Jan Vilem, et al. entitled, "Homogenization of an LED Array", which claims priority to U.S. Provisional Application No. 63/279,537 filed Nov. 15, 2021 by Jan Vilem, et al. entitled, "Homogenization of an LED Array", both of which are incorporated by reference herein as if reproduced in their entirety.

TECHNICAL FIELD OF THE DISCLOSURE

The disclosure generally relates to light-emitting diode (LED) luminaires, and more specifically to a method for homogenizing the output of a luminaire using a multi-emitter LED array.

BACKGROUND

Luminaires with automated and remotely controllable functionality (referred to as automated luminaires) are well known in the entertainment and architectural lighting markets. Such products are commonly used in theatres, television studios, concerts, theme parks, night clubs, and other venues. A typical automated luminaire provides control, from a remote location, of the output intensity, color and other functions of the luminaire allowing an operator to control such functions for many luminaires simultaneously. Many automated luminaires additionally or alternatively provide control from the remote location of other parameters such as position, focus, zoom, beam size, beam shape, and/or beam pattern of light beam(s) emitted from the luminaire.

SUMMARY

In a first embodiment, a light-emitting diode (LED) light engine includes an LED array and a partial diffuser. The partial diffuser is configured to diffuse light that is emitted by LEDs of a selected first subset of LEDs in the LED array and leave undiffused light that is emitted by LEDs of a second subset of LEDs in the LED array.

In a second embodiment, a luminaire includes an LED light engine and an optical device. The LED light engine includes an LED array and a partial diffuser. The partial diffuser is configured to diffuse light that is emitted by LEDs of a selected first subset of LEDs in the LED array and leave undiffused light that is emitted by LEDs of a second subset of LEDs in the LED array. The optical device is configured to receive a light beam comprising light emitted from the LED light engine and emit a modified light beam.

BRIEF DESCRIPTION OF THE DRAWINGS

For a more complete understanding of this disclosure, reference is now made to the following brief description, taken in conjunction with the accompanying drawings in which like reference numerals indicate like features.

DETAILED DESCRIPTION

Preferred embodiments are illustrated in the figures, like numerals being used to refer to like and corresponding parts of the various drawings.

Figure 1:
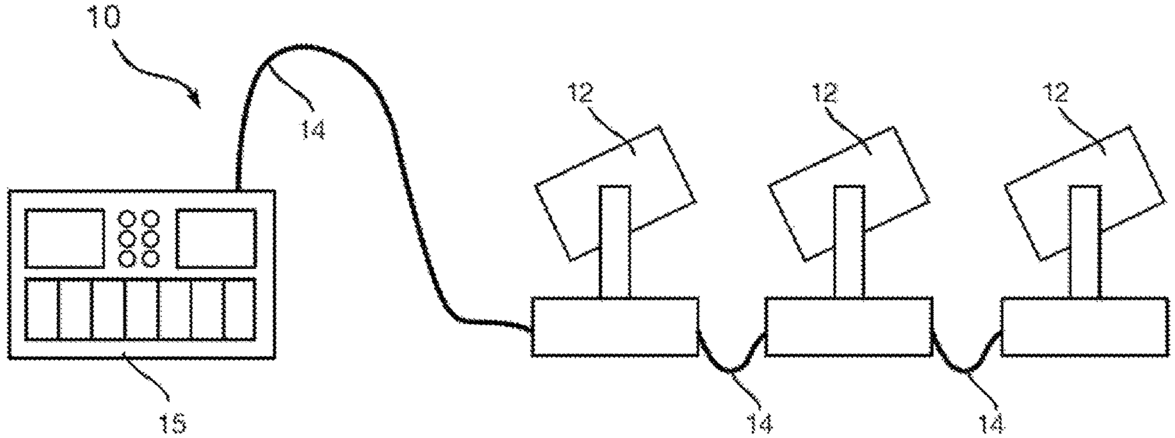
FIG. 1 presents a schematic view of a luminaire system according to the disclosure.

FIG. 1 presents a schematic view of a luminaire system 10 according to the disclosure. The luminaire system 10 includes a plurality of luminaires 12 according to the disclosure. The luminaires 12 each includes on-board a multi-emitter LED light source, light modulation devices, and may optionally include pan and/or tilt systems to control an orientation of a head of the luminaire 12.

In addition to being connected to mains power either directly or through a power distribution system, the control system of each luminaire 12 is connected in series or in parallel by a data link 14 to one or more control desks 15. Upon actuation by an operator, the control desk 15 sends control signals via the data link 14, where the control signals are received by the control system of one or more of the luminaires 12. The control systems of the one or more of the luminaires 12 that receive the control signals may respond by changing one or more of the parameters of the receiving luminaires 12. The control signals are sent by the control desk 15 to the luminaires 12 using DMX-512, Art-Net, ACN (Architecture for Control Networks), Streaming ACN, or another suitable communication protocols.

The luminaires 12 include a light source comprising a multi-emitter LED light source, sometimes referred to as a light engine. The multi-emitter LED light source may include multiple sets of LEDs where each set of LEDS emits light of a different color. In some embodiments the colors used for the LED sets may be red, green, blue, amber, and lime. In operation, through the control system, the operator may control the relative intensities of the sets of LEDs so as to additively combine the outputs and adjust the color of the emitted beam. For example, illuminating just the red and green LEDs will produce a yellow beam, blue and green will produce a cyan beam, and so on. By controlling the relative intensities of the sets of LEDs, the operator can produce a wide range of colors including deep saturated colors, pastels, and a wide range of whites of varying color temperatures.

It is desirable that the light from the different colors of LEDs is mixed and homogenized to produce a single color in the output beam of the luminaire with little to no color striping or fringing in the homogenized beam. Some luminaires have lenses or optical systems designed to aid this homogenization. However, luminaires may also have adjustable zoom optical systems enabling the beam to be adjusted from wide to narrow and, in conjunction with fast (wide aperture) lenses used to provide high output, such luminaires may still produce colored edges or stripes in their output.

Figure 2:
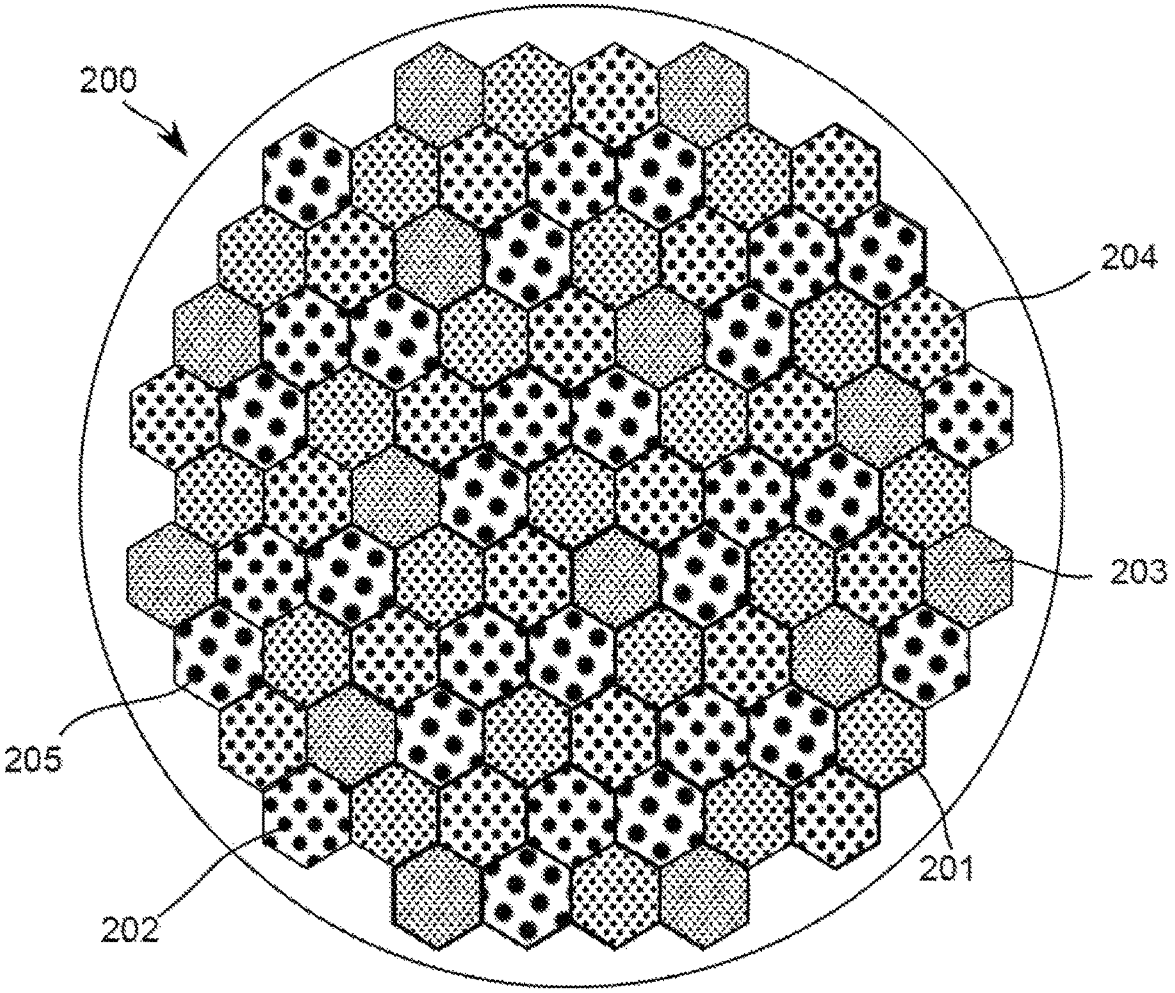
FIG. 2 presents a view of an LED array.

FIG. 2 presents a view of an LED array 200. The LED array 200 comprises multiple LED emitters arranged in an array: 5 sets of LEDs in each of red 201, green 202, blue 203, amber 204, and lime 205. The LEDs of each set may be distributed and mixed throughout the LED array 200 so as to assist with homogenizing the colors from all the LEDs into an output beam of a single color in later stages of an optical system. The approximately octagonal LED array 200 shown is merely exemplary. Arrays anticipated by this disclosure include arrays of any shape or size with any number of sets of LEDs, where each set includes any number of LEDs.

Figure 3:
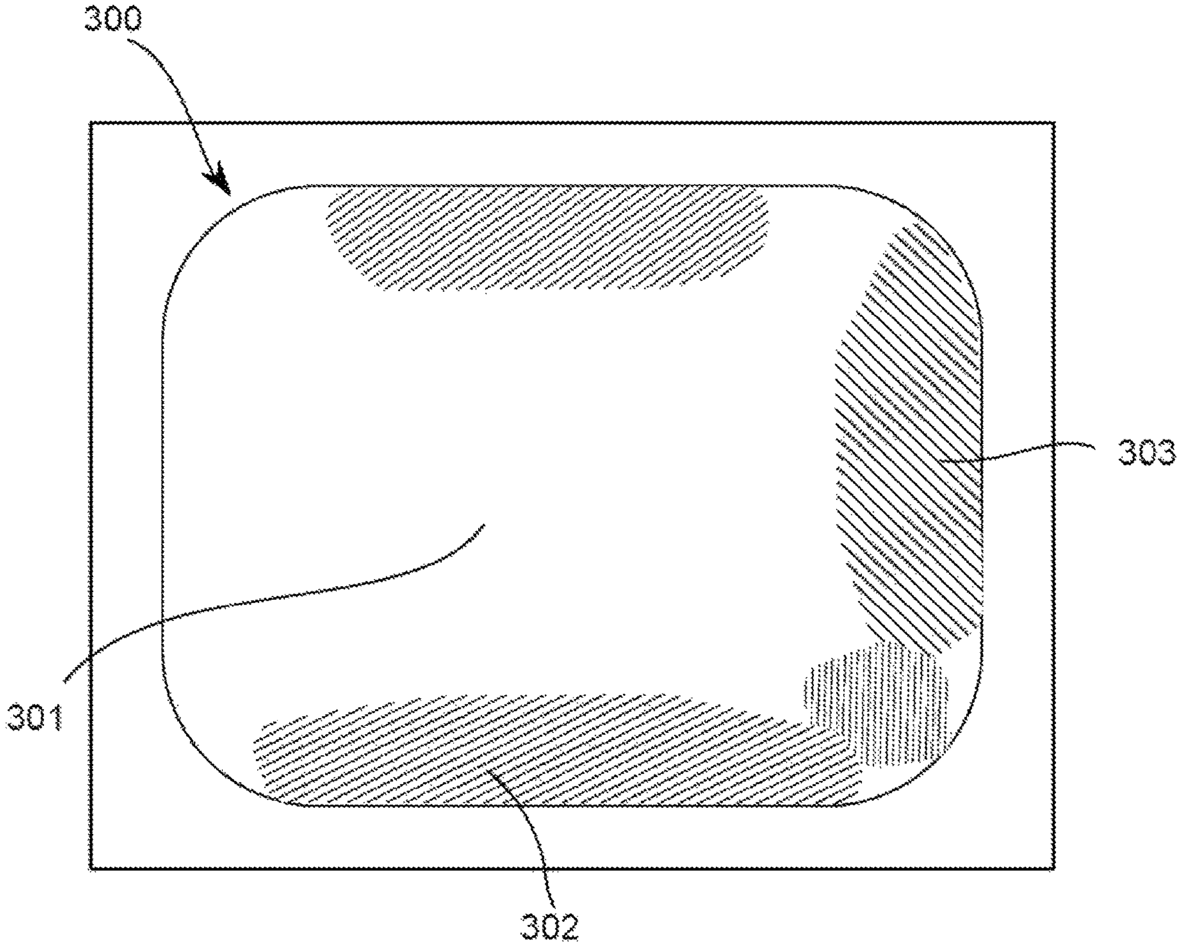
FIG. 3 presents an example of a luminaire output of a luminaire fitted with the LED array of FIG. 2.

FIG. 3 presents an example of a luminaire output 300 of a luminaire fitted with the LED array 200 of FIG. 2. The LED array 200 emits a light beam that the luminaire projects as the luminaire output 300: a nominally rectangular image with softened focus. Although the center 301 of the luminaire output 300 is well mixed, evidence of imperfect or incomplete color homogenization is schematically represented at the bottom edge 302 and left edge 303 of the rectangular image, where colored stripes and fringes are visible. This luminaire output 300 is further shown and described with reference to FIG. 4. In part because the LEDs in the LED array 200 do not share a common optical axis, the luminaire output 300 is not a perfectly even and homogenized arrangement of the different colors in the LED array 200. Other causes of the imperfect color homogenization schematically represented in FIG. 3 are discussed below, with reference to FIG. 4.

Figure 4:
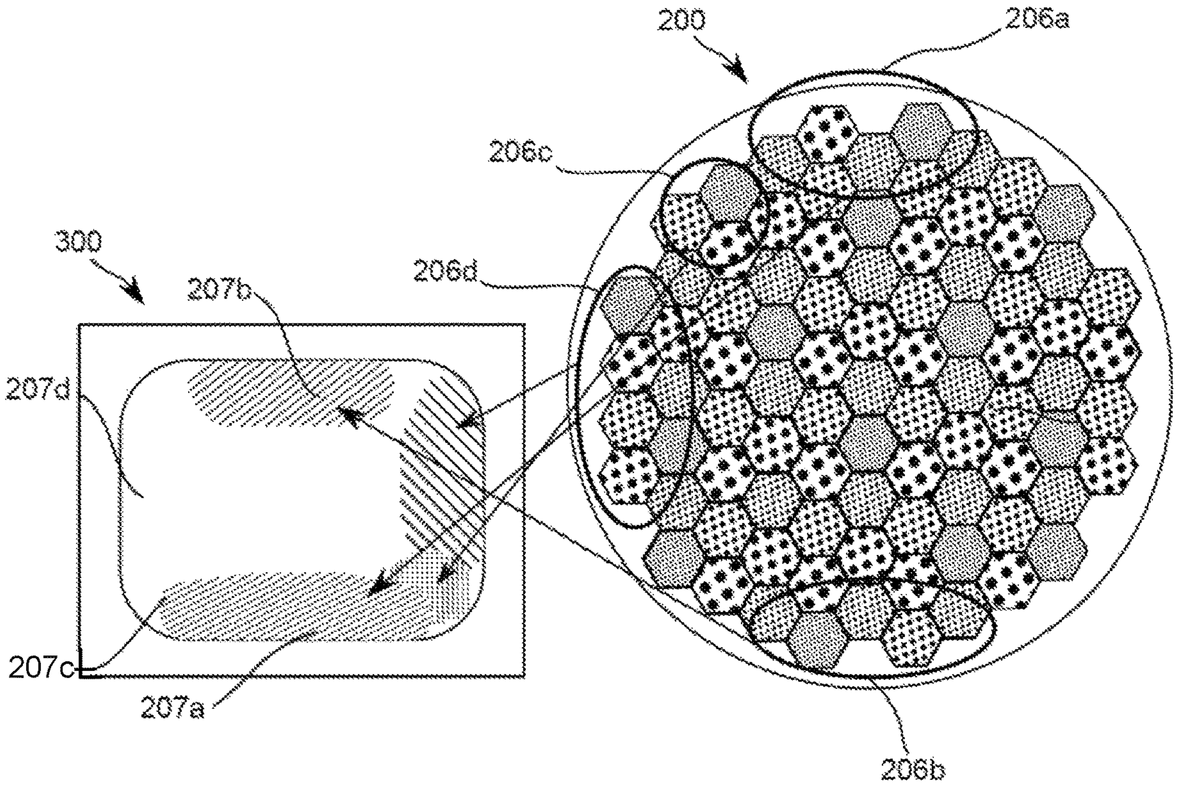
FIG. 4 presents a mapping between regions of the LED array of FIG. 2 and the colored stripes and/or fringes in the luminaire output of FIG. 3.

FIG. 4 presents a mapping between regions of the LED array 200 of FIG. 2 and the colored stripes and/or fringes in the luminaire output 300 of FIG. 3. The unwanted effects in the light beam emitted by the LED array 200 and projected by the luminaire as the luminaire output 300 show up particularly in light from groups of LEDs located on the edges of the LED array 200, where some LEDs have no immediately adjacent LED on one or more sides. FIG. 4 illustrates how LED regions 206*a*, 206*b*, 206*c*, and 206*d* of the LED array 200 emit light that produces poorly blended colors in corresponding output regions 207*a*, 207*b*, 207*c*, and 207*d* of the luminaire output 300. Because each of the LED regions 206*a*, 206*b*, 206*c*, and 206*d* is on an edge of the LED array 200, there are no adjacent LEDs on at least one side of some LEDs in the region (which may be referred to as edge LEDs). As a result, the blend of color in light from each LED region is uneven and the corresponding output regions do not have the same ratio of colors as is present in the center of the array, resulting in colored stripes and/or fringes. In one example, the prevalence of red and blue LEDs in region 206*a* leads to a magenta shift in the corresponding output region 207*a*. The other indicated LED regions have similarly unbalanced ratios of colors, resulting in color shifts in their corresponding output regions. The color blending in the output regions is improved by the partial diffuser of the disclosure, as explained in more detail below.

In some luminaires, uneven color mixing can be ameliorated by individually controlling the intensity of light outputs of the LEDs in LED regions that are close to the edge of the LED array 200. For example, if as shown in FIG. 4, an area has too much red and blue when compared to other colors, a controller of the luminaire may electrically dim the red and blue emitters in that region to reduce their output and correct the color mix in a corresponding output region. In some such embodiments, the controller of the luminaire may link such intensity changes of individual LEDs to a configuration of one or more optical devices of the luminaire. For example, the controller may apply intensity correction when a zoom lens is in a wide angle configuration that includes edge LEDs in the projected beam, and not apply correction when the zoom lens is in a narrow angle configuration where light from edge LEDs is not included in the projected beam. Such zoom lens considerations are described in more detail below with reference to FIGS. 11 and 12.

Figure 5:
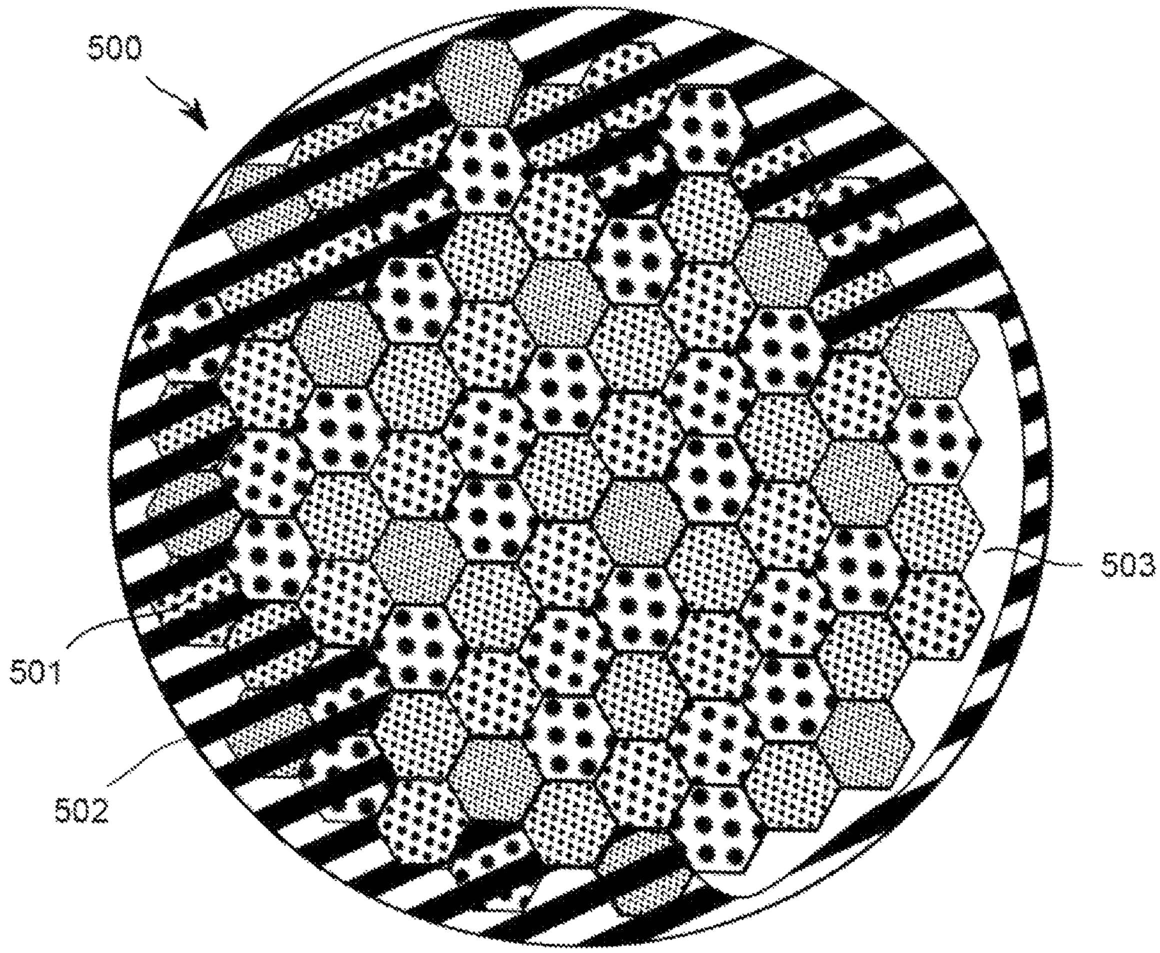
FIG. 5 presents a view of an LED light engine fitted with a partial diffuser according to the disclosure.

FIG. 5 presents a view of an LED light engine 500 fitted with a partial diffuser 502 according to the disclosure. The LED light engine 500 is suitable for use in one or more of the luminaires 12 described with reference to FIG. 1. The LED light engine 500 includes an LED array 501, fitted with the partial diffuser 502, indicated by diagonal hatching. The partial diffuser 502 overlays a first region of the LED array 501, while a second region 503 of the LED array 501 is not diffused by the partial diffuser 502. The partial diffuser 502 is referred to as a 'partial' diffuser because it is configured to diffuse light emitted by the LEDs in the first region, but to leave undiffused light emitted by the LEDs in the second region 503.

As may be seen in FIG. 5, the partial diffuser 502 overlays LEDs selected to include at least some of the LEDs in the LED regions 206*a*, 206*b*, 206*c*, and 206*d* shown in FIG. 4. The LEDs overlaid by the partial diffuser are selected—theoretically, empirically, or both—to improve color blending in a projected beam by reducing numbers and intensities of corresponding output regions of the projected beam having colored stripes or fringes or otherwise poorly blended colors.

While the partial diffuser 502 is primarily overlying LEDs around an edge of the LED array 501, in other embodiments, a partial diffuser according to the disclosure may overlay more or fewer LEDs than those overlaid by the partial diffuser 502 or may overlay LEDs in other regions of the LED array 501. The LEDs of the first region of the LED array 501 are adjacent to each other. Thus, the first region may be said to be a contiguous region of LEDs. In other embodiments the first region may comprise a plurality of non-contiguous regions of LEDs. Similarly, while the second region 503 of the LED array 501 (which is not overlaid by the partial diffuser 502) is a contiguous region, in other embodiments the second region 503 may comprise a plurality of non-contiguous regions.

While the partial diffuser 502 is shown in FIG. 5 as conforming to the edges of the LEDs in the first region, the first region is defined to include all LEDs that are overlaid wholly or in part by the partial diffuser 502. As such, the first region comprises a selected first subset of the LEDs of the LED array 501, those that are overlaid wholly or in part by the partial diffuser 502. The second region 503 is the complement of the first region, comprising a second subset of all the LEDs of the LED array 501 that are not included in the first subset.

In some embodiments, the partial diffuser 502 comprises a material such as frosted glass or frosted polymer. In other embodiments, the partial diffuser 502 comprises a thin film coating (such as titanium dioxide or other material) on a surface of an existing or additional optical element of the LED light engine 500 or the luminaire 12. In still other embodiments, the partial diffuser 502 may comprise other suitable materials for providing light diffusion. In some embodiments, the partial diffuser 502 is fabricated as a diffuser that overlays all LEDs in the LED array 501 and a portion of the diffusing material is then removed through cutting, ablation, or other removal technique to form the second region 503. Such fabrication and removal may be performed on an existing optical element of the LED light engine 500 or the luminaire 12 or on a separate element that is added to the LED light engine 500 or the luminaire 12. In still other embodiments, the partial diffuser 502 may comprise individual pieces of diffusion material.

Figure 6:
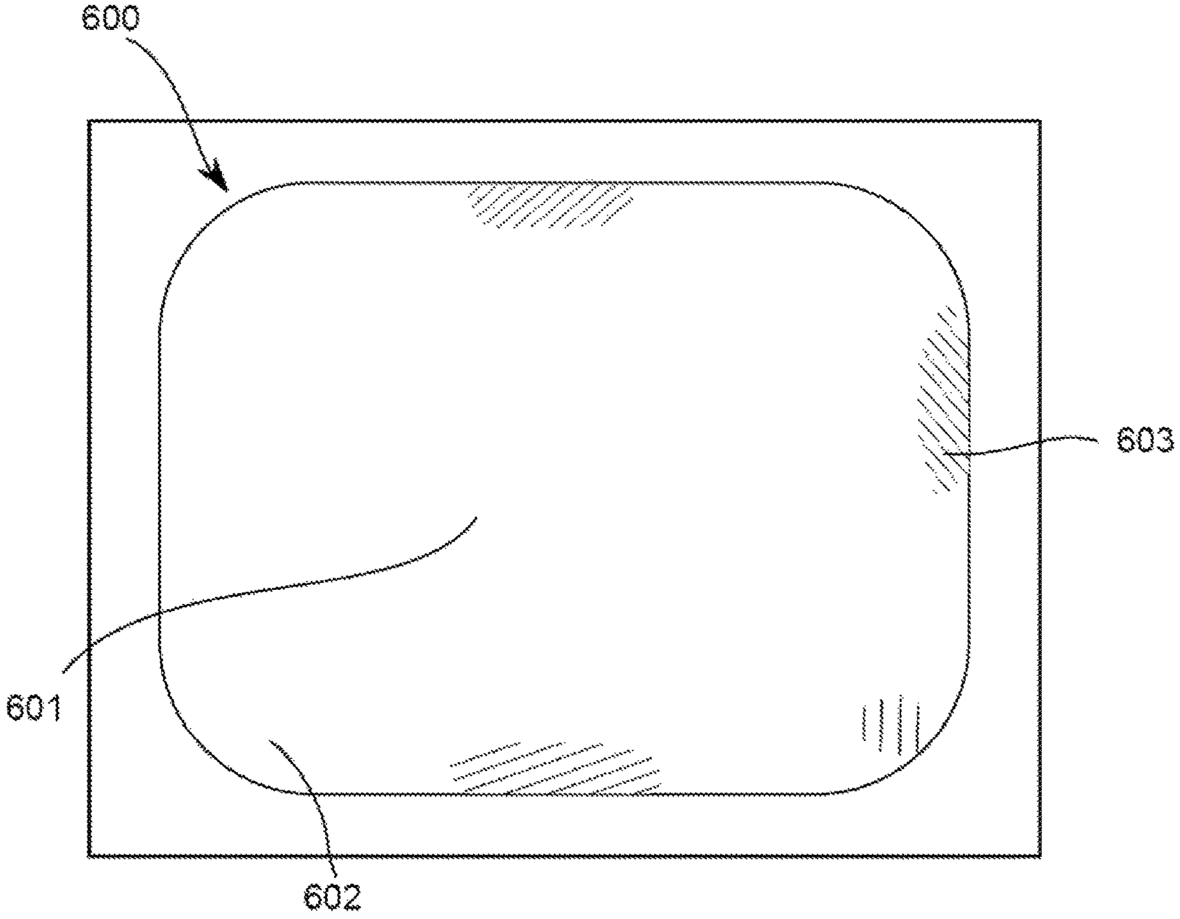
FIG. 6 presents an example of a luminaire output of a luminaire according to the disclosure fitted with the LED light engine and partial diffuser of FIG. 5.

FIG. 6 presents an example of a luminaire output 600 of a luminaire according to the disclosure fitted with the LED light engine 500 and partial diffuser 502 of FIG. 5. In the pictured example, the luminaire is projecting the same nominally rectangular image with softened focus as the image shown in FIG. 3. The center 601 of the luminaire output 600 is well mixed and, as examples, the bottom edge 602 and left edge 603 show significant improvement in homogenization (reduced size and color saturation of the fringe area) over that illustrated in FIG. 3.

Figure 7:
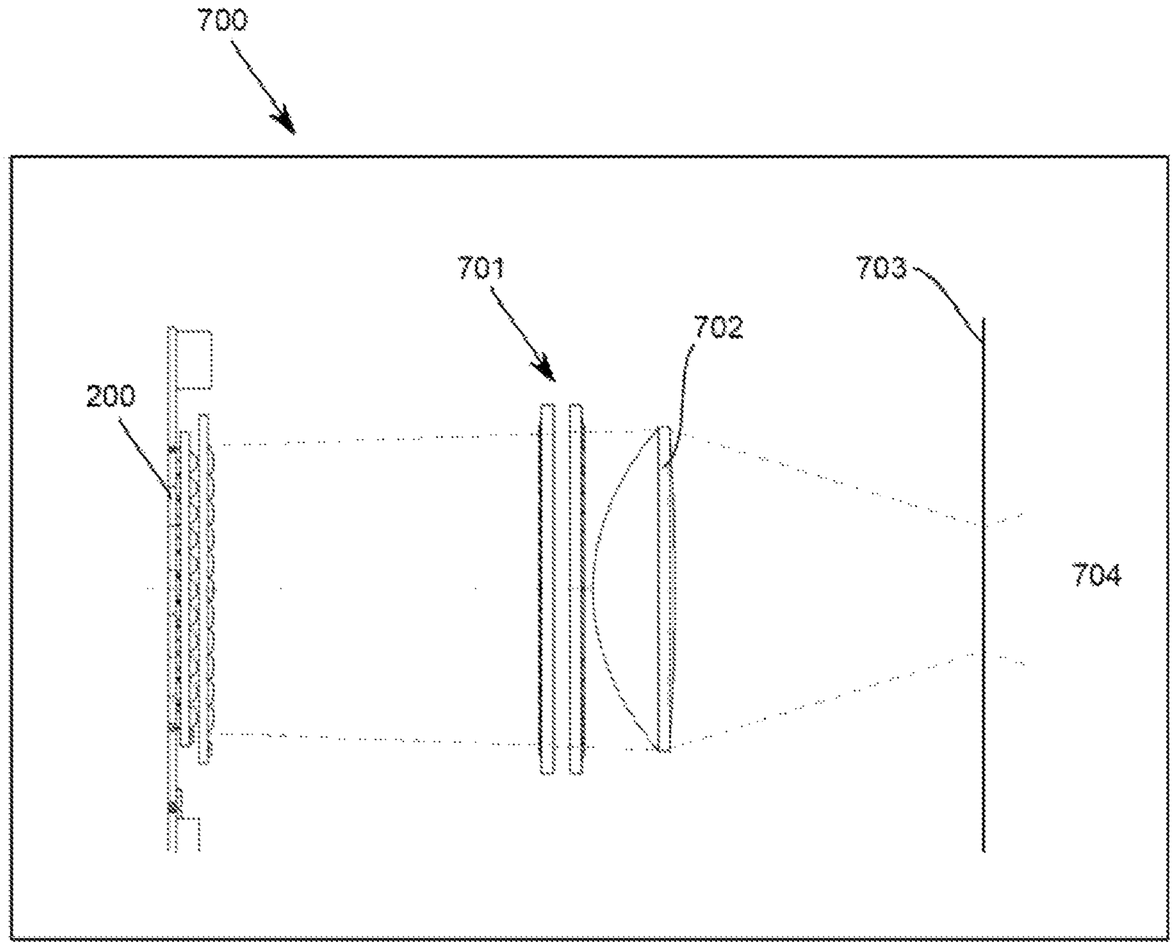
FIG. 7 presents a schematic of a portion of an optical system of a luminaire without a partial diffuser.

FIG. 7 presents a schematic of a portion of an optical system of a luminaire 700 without a partial diffuser. The luminaire 700 includes the LED array 200 of FIG. 2. Light from the LED array 200 passes through beam homogenizing optics 701 and condenser lens 702, is directed towards imaging plane 703, and then exits as beam 704 towards downstream and projection optics (not shown in FIG. 7).

Figure 8:
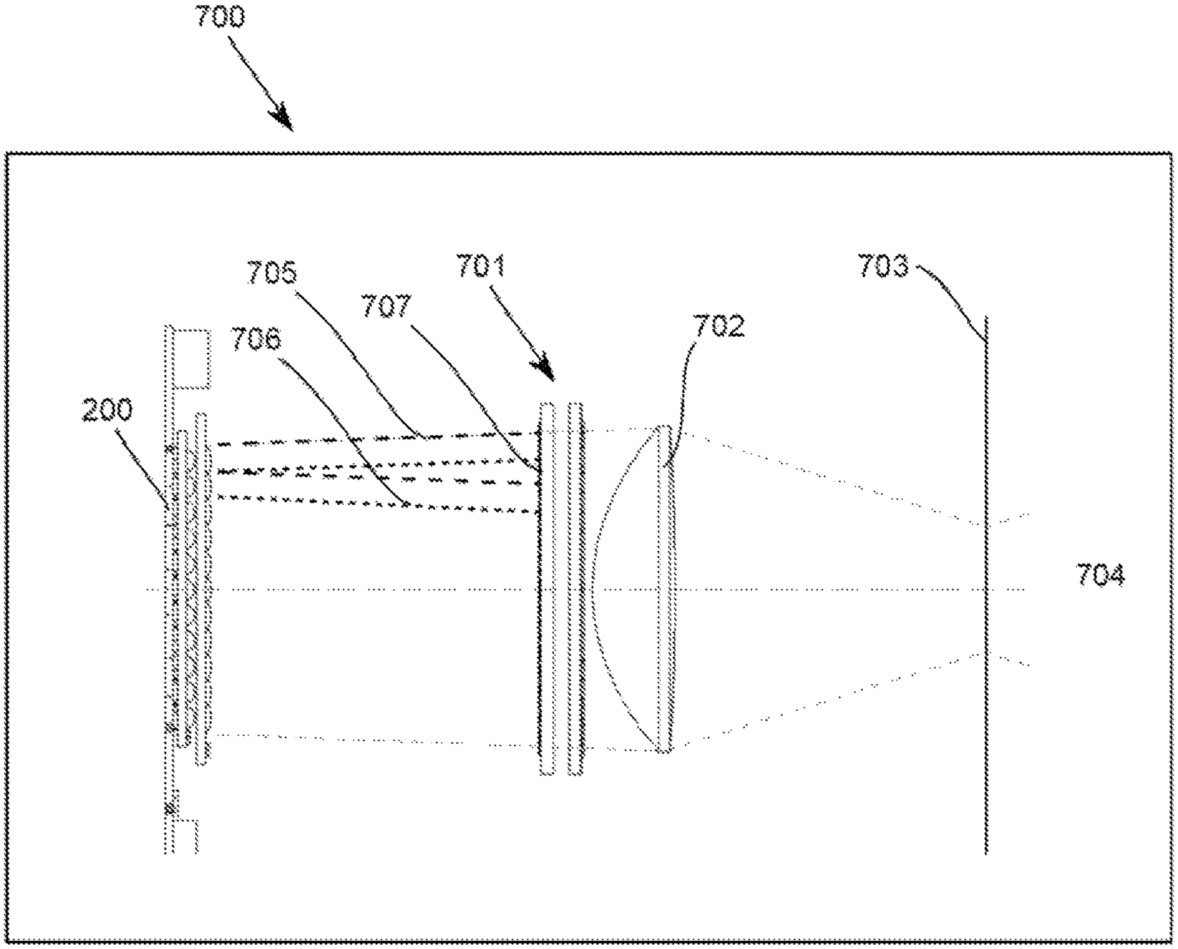
FIG. 8 shows an overlap between beams from adjacent LEDs in the luminaire of FIG. 7.

FIG. 8 shows an overlap between beams from adjacent LEDs in the luminaire 700 of FIG. 7. As an example, light beam 705 from a first LED and light beam 706 from an adjacent second LED (both LEDs of the LED array 200) are shown. These two light beams 705, 706 overlap in the region 707 where they pass through the beam homogenizing optics 701.

Figure 9:
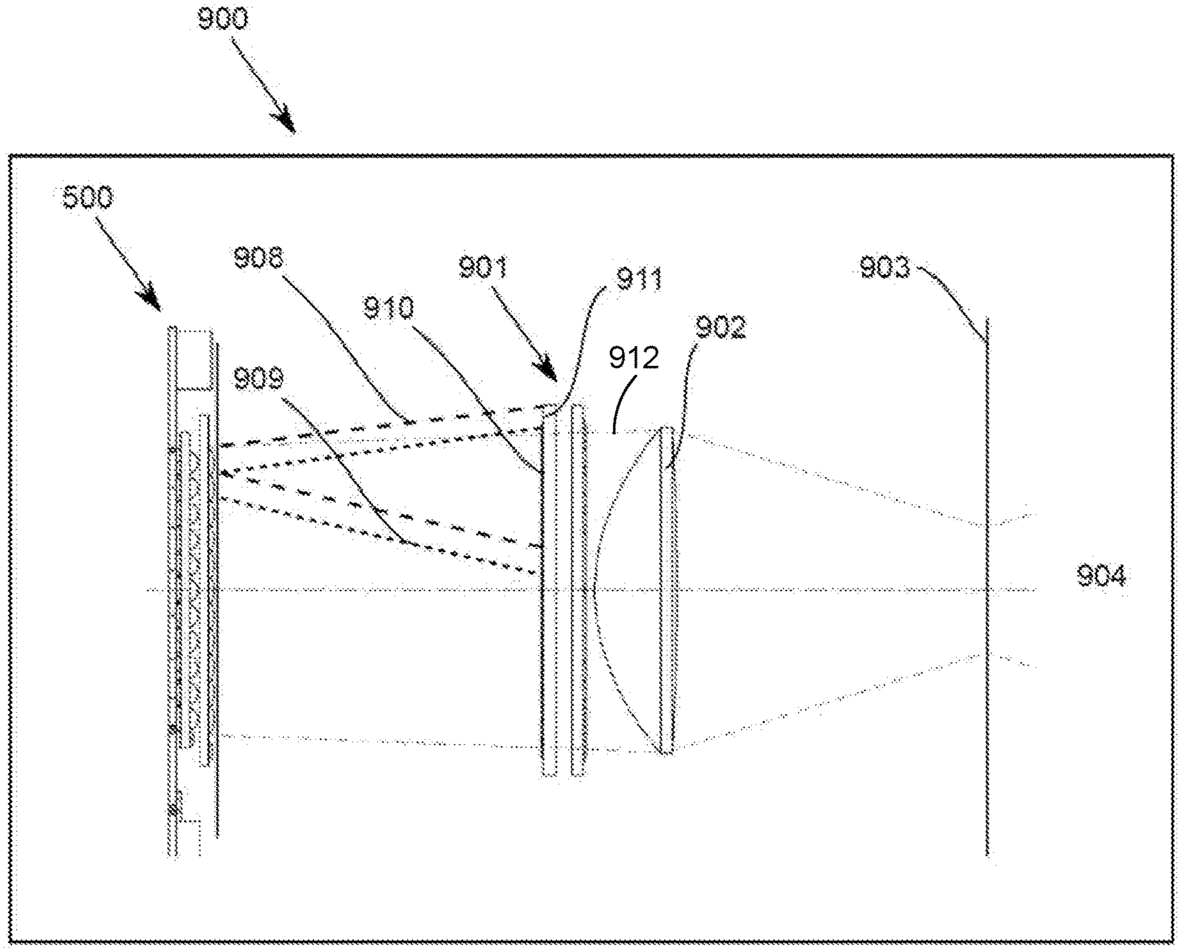
FIG. 9 presents a schematic of a portion of an optical system of a luminaire according to the disclosure.

FIG. 9 presents a schematic of a portion of an optical system of a luminaire 900 according to the disclosure. The luminaire 900 may comprise a fixedly mounted fixture, the panning/tilting head of the luminaires 12 described with reference to FIG. 1, or the light engine of a moving mirror fixture. The luminaire 900 includes the LED light engine 500 of FIGS. 5 and 10. A light engine light beam as emitted by the LED light engine 500 passes through optical devices such as beam homogenizing optics 901, a condenser lens 902, and an imaging plane 903, before exiting the imaging plane 903 as a light beam 904 and passing through projection optics, zoom lenses, and/or other optical devices such as lenses, gobos, irises, or prisms (not shown in FIG. 9) to emit from the luminaire 900 as a luminaire light beam. In various embodiments, the light engine light beam emitted by the LED light engine 500 may be received by more, fewer, or different optical devices than those shown and described with reference to FIG. 9 before being emitted as a modified light beam.

FIG. 9 also shows an overlap between beams from adjacent LEDs in the first region of the LED array 501, overlaid by the partial diffuser 502. A light beam 908 from a first LED and a light beam 909 from an adjacent second LED (both LEDs being in the first region of the LED light engine 500) are shown. These two beams, having passed through the partial diffuser 502, are wider than the light beams 705 and 706 shown in FIG. 8 and a resulting overlap region 910 is significantly larger than the overlap region 707 shown in FIG. 8. This larger overlap region 910 entering the beam homogenizing optics 901 produces an improved homogeneity across the beam. The region 911 represents light loss where the light has been diffused outside the edge 912 of the optical system.

Figure 10:
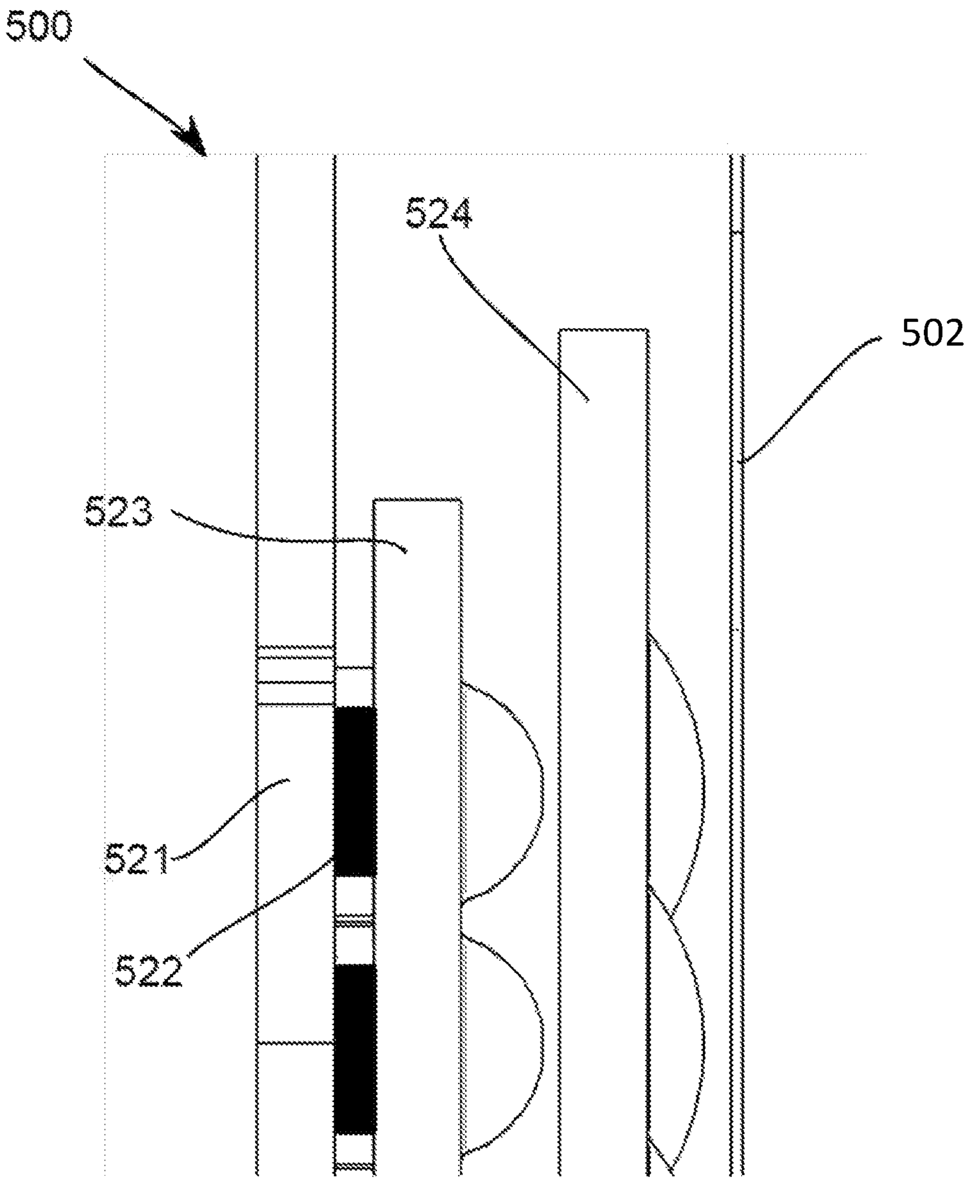
FIG. 10 presents an elevation of the LED light engine of FIG. 9.

FIG. 10 presents an elevation of the LED light engine 500 of FIG. 9. The LED light engine 500 comprises an array of LEDs 522 and associated light engine optics according to the disclosure. The LEDs 522 are mounted to a substrate 521. Light from the LEDs 522 passes through a first lens array 523, a second lens array 524 and the partial diffuser 502. In the embodiment shown in FIG. 10, the partial diffuser 502 is an optical element positioned in the light beam emitted by the LEDs 522, after the second lens array 524. In other embodiments, the partial diffuser 502 may be an optical element positioned in the light beam emitted by the LEDs 522 between the LEDs 522 and the first lens array 523 or between the first lens array 523 and the second lens array 524.

In some embodiments, the partial diffuser 502 may be applied as a coating to an optical surface of any of these components, including, but not limited to, the front (light emitting) surface of the LEDs 522, front or rear surfaces of the first lens array 523, or front or rear surfaces of the second lens array 524. As used herein, the rear surface of a lens is the surface that receives light and the front surface of the lens is the surface that emits light.

Either of the luminaires 700 or 900 may include a zoom optical system. When the zoom optical system is configured to project a wide angle beam, all light emitted by its light source (e.g., the LED array 200 or the LED light engine 500) enters and is emitted from the zoom optical system. However, when the zoom optical system is configured to project a narrow angle beam, all light emitted by the light source still enters the zoom optical system, but only light emitted by a central region of the light source is emitted from the zoom optical system. Thus, it may be said that the zoom optical system's 'view' or 'field of view' of the light source varies as the beam angle is adjusted. Similarly, the central region of the light source may be said to be the only part of the light source that is 'seen' by or is 'visible' to an output lens of the zoom optical system.

Figure 11:
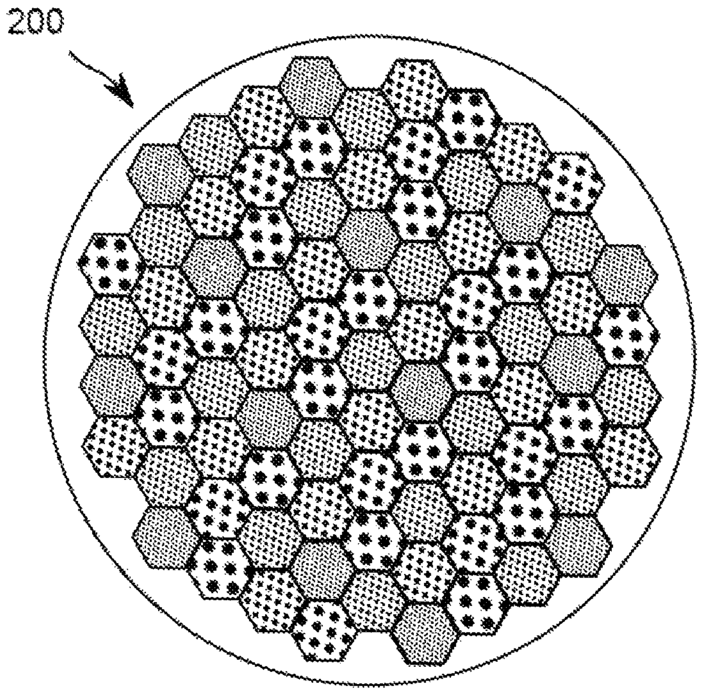
FIG. 11 presents a view of the LED array of FIG. 2 as seen by an output of a zoom optical system in a wide angle configuration.
Figure 12:
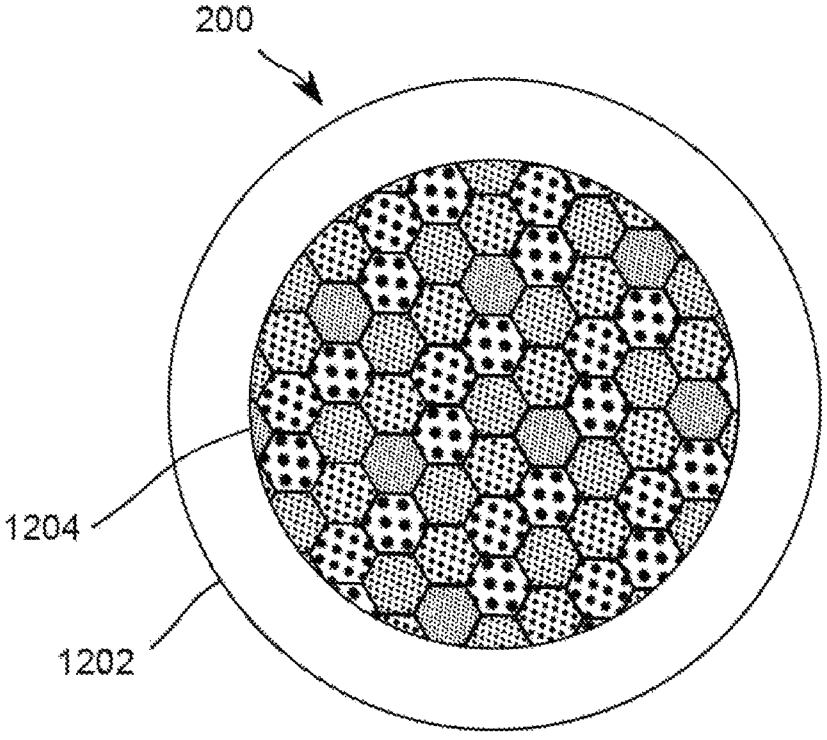
FIG. 12 presents a view of the LED array of FIG. 2 as seen by the output lens of the zoom optical system in a narrow angle configuration.

FIG. 11 presents a view of the LED array 200 as seen by an output of a zoom optical system in a wide angle configuration. The entire LED array 200 is visible in the output of the zoom optical system. However, when the zoom optical system is in a narrow angle configuration, the field of view of the array may be vignetted, resulting in only a central portion of the LED array 200 being visible. FIG. 12 presents a view of the LED array 200 as seen by the output lens of the zoom optical system in a narrow angle configuration. LEDs located between an outer edge 1202 of the LED array 200 and a vignette edge 1204 are not visible to the output lens. As a result, the mix (or ratio) of LEDs of different colors in the projected light beam may vary as the zoom optical system moves between wide angle and narrow angle configurations, resulting in a change in color of and/or differing numbers and intensities of colored stripes and fringes in the projected beam.

Figure 13:
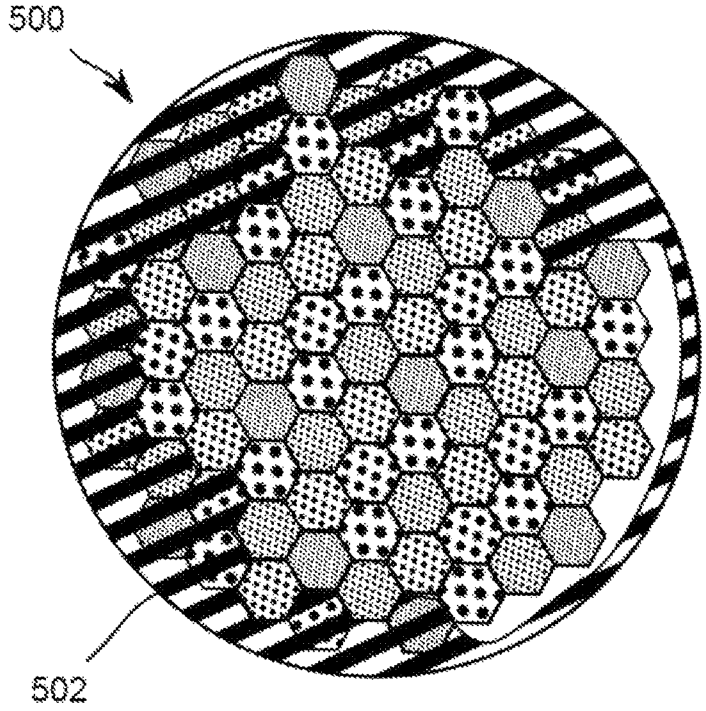
FIG. 13 presents a view of the LED light engine of FIG. 5 as seen by an output of a zoom optical system in a wide angle configuration.
Figure 14:
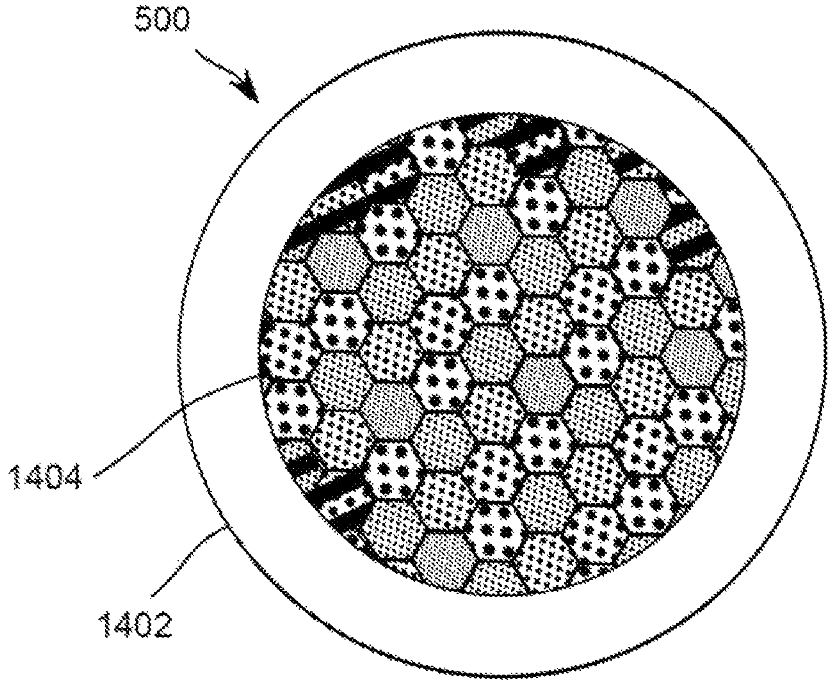
FIG. 14 presents a view of the LED light engine of FIG. 5 as seen by the output lens of the zoom optical system in a narrow angle configuration.

In a similar fashion, FIGS. 13 and 14 show the field of view of the LED light engine 500, including the partial diffuser 502. FIG. 13 presents a view of the LED light engine 500 as seen by an output of a zoom optical system in a wide angle configuration. FIG. 14 presents a view of the LED light engine 500 as seen by the output lens of the zoom optical system in a narrow angle configuration. LEDs located between an outer edge 1402 of the LED light engine 500 and a vignette edge 1404 are not visible to the output lens.

In the embodiment shown in FIGS. 13 and 14, the diffusion applied to the LEDs in the first region of the LED array 501 by the partial diffuser 502 is fully visible to the output of the zoom optical system in the wide angle configuration (as shown in FIG. 13). When the zoom optical system is in the narrow angle configuration, fewer of the LEDs in the first region of the LED array 501 are visible to the lens (as shown in FIG. 14). However, some of the light from LEDs in the first region between the outer edge 1402 and the vignette edge 1404 is spread by the partial diffuser 502 towards the center of the beam, which results in the mix (or ratio) of different colors of the LED array 501 remaining more nearly constant in the homogenized beam, providing a reduced color change as the zoom lens moves between the wide angle configuration and the narrow angle configuration.

As described with reference to FIG. 5, the partial diffuser 502 overlays a first subset of the LEDs of the LED array 501, where the LEDs of the first subset are selected to improve color blending in a beam projected by the luminaire 900. As may be seen in FIG. 14, some of the LEDs in the first subset may be selected to improve color blending in a beam projected when the zoom optical system is in a narrow angle configuration.

While only some embodiments of the disclosure have been described herein, those skilled in the art, having benefit of this disclosure, will appreciate that other embodiments may be devised which do not depart from the scope of the disclosure herein. While the disclosure has been described in detail, it should be understood that various changes, substitutions, and alterations can be made hereto without departing from the spirit and scope of the disclosure.

What is claimed is:

1. A light-emitting diode (LED) light engine comprising:

an LED array comprising a plurality of color sets of LEDs, wherein each color set of LEDS emits light of a characteristic color, the characteristic color of each color set different from the characteristic color of the other color sets; and a partial diffuser, configured to diffuse light emitted from LEDs of a selected first subset of LEDs in the LED array and leave undiffused light emitted from LEDs of a second subset of LEDs in the LED array, wherein the first subset of LEDs comprises LEDs selected for inclusion as emitting light that produces colored stripes or fringes in an undiffused light beam emitted by the LED array.

2. The LED light engine of claim 1, wherein the partial diffuser comprises a first optical element positioned in a light beam emitted by the LED array.

3. The LED light engine of claim 1, wherein the partial diffuser comprises a diffusing material applied to a surface of a second optical element of the LED light engine.

4. The LED light engine of claim 3, wherein the second optical element comprises a lens array and the partial diffuser comprises a thin film coating on a front surface of the lens array.

5. The LED light engine of claim 1, wherein the LEDs of the first subset are adjacent to each other.

6. The LED light engine of claim 1, wherein the LEDs of the first subset comprise a plurality of non-contiguous regions of LEDs.

7. The LED light engine of claim 1, wherein the LEDs of the second subset comprise a plurality of non-contiguous regions of LEDs.

8. A luminaire comprising:

a light-emitting diode (LED) light engine comprising:

an LED array comprising a plurality of color sets of LEDs, wherein each color set of LEDS emits light of a characteristic color, the characteristic color of each color set different from the characteristic color of the other color sets; and a partial diffuser, configured to diffuse light emitted from LEDs of a selected first subset of LEDs in the LED array and leave undiffused light emitted from LEDs of a second subset of LEDs in the LED array, wherein the first subset of LEDs comprises LEDs selected for inclusion as emitting light that produces colored stripes or fringes in an undiffused light beam emitted by the LED array; and an optical device configured to receive a light beam comprising light emitted from the LED light engine and emit a modified light beam.

9. The luminaire of claim 8, wherein the partial diffuser comprises a first optical element positioned in the light beam emitted by the LED array.

10. The luminaire of claim 8, wherein the partial diffuser comprises a diffusing material applied to a surface of a second optical element of the LED light engine.

11. The luminaire of claim 10, wherein the second optical element comprises a lens array and the partial diffuser comprises a thin film coating on a front surface of the lens array.

12. The luminaire of claim 8, wherein the LEDs of the first subset are adjacent to each other.

13. The luminaire of claim 8, wherein the LEDs of the first subset comprise a plurality of non-contiguous regions of LEDs.

14. The luminaire of claim 8, wherein the LEDs of the second subset comprise a plurality of non-contiguous regions of LEDs.

15. The luminaire of claim 8, further comprising a zoom optical system configured to receive the modified light beam, wherein at least some LEDs of the first subset of LEDs are visible to an output lens of the zoom optical system when the zoom optical system is in a narrow angle configuration.

16. The luminaire of claim 15, wherein the first subset of LEDs comprises LEDs selected for inclusion as emitting light that produces colored stripes or fringes in an undiffused light beam emitted by the LED array when the zoom optical system is in a narrow angle configuration.

* * * * *